*R. B. Carsley,*
*Turning Regular Forms,*
N°41,277. Patented Jan. 19, 1864.
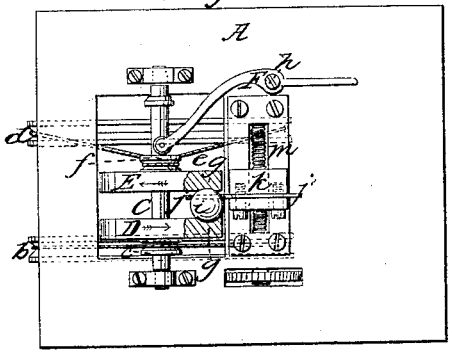
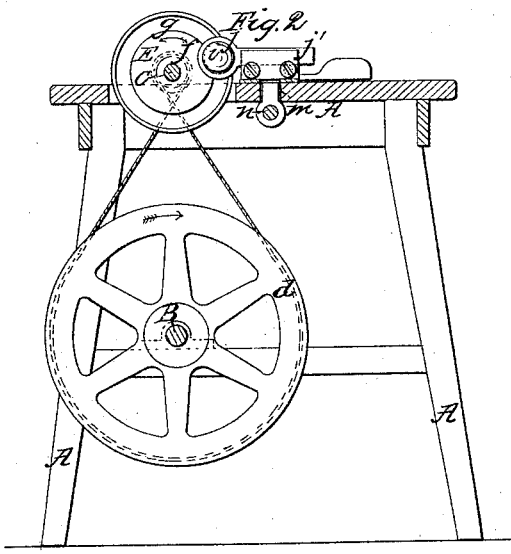
Witnesses: Inventor:

UNITED STATES PATENT OFFICE.

ROBERT B. CARSLEY, OF NEW BEDFORD, MASSACHUSETTS.

IMPROVEMENT IN LATHES FOR TURNING SPHERICAL SHAPES.

Specification forming part of Letters Patent No. 41,277, dated January 19, 1864.

*To all whom it may concern:*

Be it known that I, ROBERT B. CARSLEY, of New Bedford, in the county of Bristol and State of Massachusetts, have invented a new and Improved Machine for Turning and Finishing Bodies of Spherical Form; and I do hereby declare that the following is a full, clear, and exact description of the same, reference being had to the accompanying drawings, forming part of this specification, in which—

Figure 1 is a plan of the machine, partly in section. Fig. 2 is a vertical section of the same.

Similar letters of reference indicate corresponding parts in both figures.

This invention consists in the combination of two disks rotating in opposite directions about the same axis and a circular or annular cutter arranged between the said disks, as hereinafter specified.

To enable others skilled in the art to make and use my invention, I will proceed to describe its construction and operation.

A is the framing of the machine, made in the form of a table, having on its lower rails the bearings for the horizontal driving-shaft B, and on its top the bearings for the shaft C, which carries the two disks D and E. The disk D is fast upon the shaft C, and derives motion through an open band, $a$, running from a large pulley, $b$, on the driving-shaft B to a small pulley, $c$, formed on its own hub. The disk E is loose on the shaft C, and receives motion through a crossed band, $e$, running from a pulley, $d$, on the driving-shaft B to a small pulley, $f$, on its own shaft—the one being driven by an open, and the other by a crossed band. The two disks rotate in opposite directions.

The opposite faces of the two disks may be flat or may have corresponding very shallow concentric grooves, $g\,g$, as shown in the drawings, for the reception of the body $i$ which is to be turned. The loose disk E is capable of moving lengthwise of the shaft C, from and toward the disk D, to permit the introduction of the said body between them and its removal from them. The said disk E has applied to it a lever, F, by which to press it toward the disk D, the said lever being attached by its fulcrum-pin $h$ to the top of the table.

$j$ is the cutter, made in the form of a ring and having its inner edge, which is the cutting-edge, in the form of a true circle. This cutter is made with a straight shank, $j'$, to enable it to be conveniently secured in the machine, and this shank is clamped by a clamp, $k$, and screws $l\,l$, or other suitable means, to a stock, G, which is arranged to travel parallel with the shaft C in a slot, $m$, provided in the table. This stock is operated by a screw, $n$, to bring the cutter nearer to or farther from the disk D, which, on account of its not moving lengthwise of the shaft, I term the "fixed disk." The edge of the cutter occupies a plane parallel with the planes of rotation of the disks, and when the disks are furnished with grooves $g\,g$ the center of the circle of its edge is opposite the middles of the grooves $g\,g$.

Before being introduced to this machine the body or article $i$ to be turned or finished by it, if not already of a form approximating to a true sphere, should be turned to such form in a lathe. To introduce the body or article to the machine, the movable disk E and the cutter $j'$ are drawn away from the fixed disk D to permit the said article or body to be placed between the latter disk and the cutter, and the said article or body is held against the latter disk by hand or otherwise until the cutter has been moved up toward it far enough to hold it against the said disk. The movable disk is then moved up to the body or article and the machine set in motion. The rotary motion of the two disks in opposite directions then imparts to the article or body a compound rotary motion—viz., a rapid rotary motion in planes parallel with the axis of the disks and a slow rotary motion in planes parallel with the planes of rotation of the disks, the latter motion being produced by the difference of velocity of the portions of the disks with which the article or body is in contact which results from the difference in the distance of said portions from the axis of the disks. The cutter is in the meantime fed slowly toward the disk D, and the whole surface of the body or article $i$ is subjected to its action in such a manner that it cannot fail to be reduced to a true sphere. As the reduction of the sphere progresses the disk E is pressed up gradually toward the disk D, to keep it in contact with the body or article. This may be done by the pressure of the hand against the lever F or by a spring applied to act against the said lever.

The machine is adapted to the turning or finishing of billiard-balls or other articles of ivory, wood, metal, or other material of spherical form.

What I claim as new, and desire to secure by Letters Patent, is—

The combination of the two disks D E, rotating in opposite directions, and the annular cutter j, substantially as and for the purpose herein specified.

ROBERT B. CARSLEY.

Witnesses:
 LUTHER COLE,
 WILLIAM C. ELDREDGE.